UNITED STATES PATENT OFFICE.

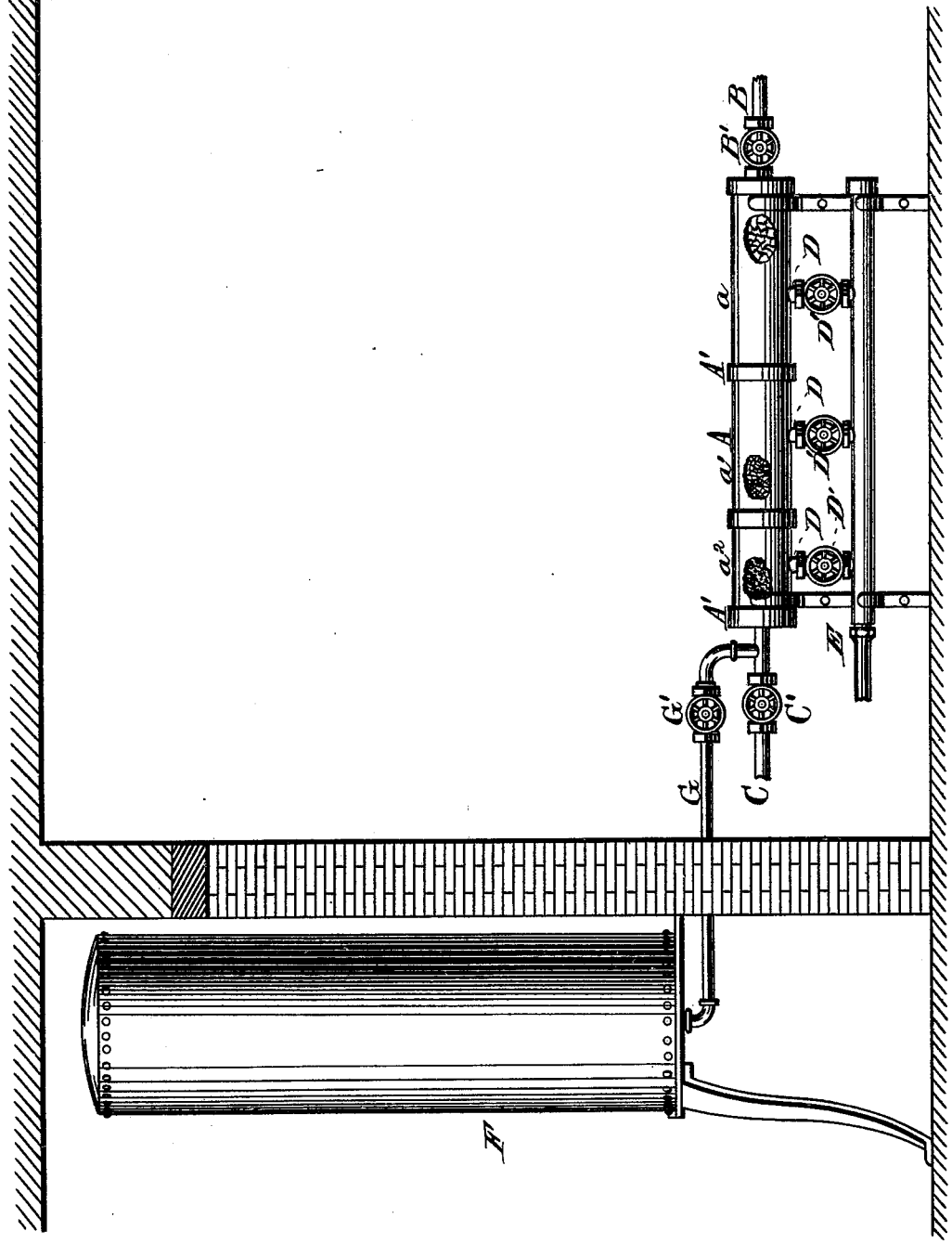

RALPH S. JENNINGS, OF NEW YORK, N. Y., ASSIGNOR OF ONE-HALF HIS RIGHT TO NORMAN G. KELLOGG, OF SAME PLACE.

IMPROVEMENT IN FILTERS.

Specification forming part of Letters Patent No. 188,144, dated March 6, 1877; application filed November 3, 1876.

*To all whom it may concern:*

Be it known that I, RALPH S. JENNINGS, of New York, in the county of New York and State of New York, have invented a new and valuable Improvement in Filters; and I do hereby declare that the following is a full, clear, and exact description of the construction and operation of the same, reference being had to the annexed drawing, making a part of this specification, and to the letters and figures of reference marked thereon.

The figure of the drawing is a representation of a front elevation of my filter as applied.

The object of this invention is to furnish means for cleansing stationary filters. This object is accomplished by providing each one of said filters with a series of waste-pipes, leading from the bottom of every part of the same to a sewer-pipe or other receptacle; and, also, by so connecting said filter with a boiler that a reversed current of hot water can be sent through the said filter.

In the annexed drawings, A designates the cylindrical casing of my filter, which is firmly secured to a cellar-wall or other immovable support. One of the heads or ends of said cylinder (preferably that at the right hand) is provided with an inlet-pipe, B, through which water is supplied to said filter from the street-main or other source, and which is provided with a cut-off cock, B', whereby the water may be admitted to or excluded from said filter at will. The other end of said casing is provided with an outlet-pipe, C, which supplies the building, and which is provided with a similar cock, C'. Said cylinder is provided with annular bracing-bands A' A', marking the separating-lines between three distinct parts or divisions of the filter, $a$ $a^1$ $a^2$. The coarsest part $a$ of the said filter is at the inlet end, and the finest part $a^2$ is at the outlet end, $a^1$ being intermediate, both in location and in degree of fineness. These parts may be separated by open-work partitions, if preferred. The material of the last division $a^2$ is preferably charcoal, which decolorizes as well as purifies the water; but any equivalent substance may be substituted. Each one of these parts or divisions is provided at the bottom with a discharge-pipe, D, having an opening and closing cock, D'. These discharge-pipes D communicate with a sewer-pipe, E, or other suitable receptacle for waste-water. F designates an ordinary kitchen-boiler, for supplying a building with hot water. It is supplied with water by means of outlet-pipe C. It also communicates with said outlet or supply pipe C at a point between cock C' and filter A by means of hot-water pipe G. Said pipe is provided with a cock, G', for permitting or stopping the flow of water at will.

The operation of the device is as follows: When the cocks B' and C' are opened, and the remaining cocks above described are all closed, the water will flow through filter A from $a$ to $a^2$, and thence, in a purified condition, to all parts of the building, or wherever a supply may be required. But in so doing it will deposit many forms of animal and vegetable impurities in the said filter, and also some mineral substances, such as magnesia, lime, and the various salts which may have been held in solution. These mineral substances are especially likely to be deposited in the charcoal of division $a^2$. Owing to these accumulations, the filter becomes after a time unfit to perform its work. To remedy this defect reverse currents of cold water have heretofore been employed. These currents are tolerably efficacious in removing the animal and vegetable deposits, but generally leave the mineral deposits still in the charcoal, which, consequently, requires to be withdrawn from the casing and cleansed separately. My apparatus obviates the necessity for this separate cleansing. When the cocks B' and C' are closed and the remaining cocks are opened, hot water will flow from boiler F into the end $a^2$ of filter A, and out through discharge-pipes D, dissolving in its course, and carrying with it, such substances as cold water would leave behind. As the outlets D are at the bottom of every one of the divisions $a$ $a^1$ $a^2$, the hot water conveying impurities from one part of the filter will not pass through any other part thereof in seeking an exit, and thus another cause of imperfect cleansing is avoided. As the boilers employed for such purposes are self-feeding, there is always in them a sufficient supply of water for the purpose described. It is not necessary, however, that the hot water should be conveyed from said boiler to said filter, as said filter may be connected with any of the branch hot-water pipes of the house. In structures which have a water-tank in or on the roof as a source of water-supply, the filter will preferably be located at or near the top of the building. The expansive power of the steam in the boiler will in most cases suffice to raise the hot water to said filter; but any ordinary pump or other form of water-elevating device may be employed. Various other modifications may be made without departing from the spirit and scope of my invention.

What I claim as new, and desire to secure by Letters Patent, is—

The combination of cylinder A with inlet-pipe B, outlet-pipe C, waste-water pipes D, boiler F, and hot-water pipe G, each one of said pipes being provided with a suitable cock, substantially as set forth.

In testimony that I claim the above I have hereunto subscribed my name in the presence of two witnesses.

RALPH S. JENNINGS.

Witnesses:
 JOS. B. LOOMIS,
 C. H. McEWEN.